United States Patent
Bunker et al.

(10) Patent No.: US 9,249,491 B2
(45) Date of Patent: Feb. 2, 2016

(54) COMPONENTS WITH RE-ENTRANT SHAPED COOLING CHANNELS AND METHODS OF MANUFACTURE

(71) Applicant: GENERAL ELECTRIC COMPANY, Schenectady, NY (US)

(72) Inventors: Ronald Scott Bunker, Waterford, NY (US); Dennis Michael Gray, Delanson, NY (US)

(73) Assignee: General Electric Company, Niskayuna, NY (US)

(*) Notice: Subject to any disclaimer, the term of this patent is extended or adjusted under 35 U.S.C. 154(b) by 370 days.

(21) Appl. No.: 13/669,922

(22) Filed: Nov. 6, 2012

(65) Prior Publication Data

US 2013/0056184 A1     Mar. 7, 2013

Related U.S. Application Data

(63) Continuation-in-part of application No. 12/943,624, filed on Nov. 10, 2010, now Pat. No. 8,387,245.

(51) Int. Cl.
| | |
|---|---|
| *B32B 3/12* | (2006.01) |
| *C23C 4/02* | (2006.01) |
| *B23P 15/04* | (2006.01) |
| *B24C 1/04* | (2006.01) |
| *C23C 4/12* | (2006.01) |
| *F01D 5/18* | (2006.01) |
| *C23C 24/04* | (2006.01) |

(52) U.S. Cl.
CPC . *C23C 4/02* (2013.01); *B23P 15/04* (2013.01); *B24C 1/04* (2013.01); *C23C 4/12* (2013.01); *C23C 24/04* (2013.01); *F01D 5/186* (2013.01); *B23P 2700/13* (2013.01); *F05D 2230/90* (2013.01); *Y02T 50/67* (2013.01); *Y02T 50/672* (2013.01); *Y02T 50/676* (2013.01); *Y10T 29/4935* (2015.01); *Y10T 29/49323* (2015.01)

(58) Field of Classification Search
None
See application file for complete search history.

(56) References Cited

U.S. PATENT DOCUMENTS

| | | |
|---|---|---|
| 4,487,550 A | 12/1984 | Horvath et al. |
| 4,893,987 A | 1/1990 | Lee et al. |
| 5,564,902 A | 10/1996 | Tomita |

(Continued)

FOREIGN PATENT DOCUMENTS

EP     1387040 B1     4/2004

OTHER PUBLICATIONS

Hyams et al., "A Detailed Analysis of film Cooling Physics: Part III—Streamwise Injection With Shaped Holes," Journal of Turbomachinery, vol. 122, Issue 1, Jan. 2000, pp. 122-132.

(Continued)

*Primary Examiner* — Adam Krupicka
(74) *Attorney, Agent, or Firm* — Ann M. Agosti

(57) ABSTRACT

A method of fabricating a component is provided. The component includes a substrate that has at least one interior space. The method includes forming one or more grooves in the component. Each groove extends at least partially along an outer surface of the substrate and narrows at an opening thereof, such that each groove is re-entrant shaped. A cross-sectional area A of each groove is in a range of about 2 to about 3 times an area R=W*D, where W is the width of the opening and D is the depth of the re-entrant-shaped groove. Components with grooves formed in the substrate and components with grooves formed at least partially in a structural coating are also provided.

22 Claims, 8 Drawing Sheets

(56) References Cited

U.S. PATENT DOCUMENTS

| | | | |
|---|---|---|---|
| 5,626,462 A | 5/1997 | Jackson et al. | |
| 5,640,767 A | 6/1997 | Jackson et al. | |
| 5,660,523 A | 8/1997 | Lee | |
| 5,875,549 A | 3/1999 | McKinley | |
| 6,059,530 A | 5/2000 | Lee | |
| 6,086,328 A | 7/2000 | Lee | |
| 6,164,914 A | 12/2000 | Correia et al. | |
| 6,190,129 B1 | 2/2001 | Mayer et al. | |
| 6,214,248 B1 | 4/2001 | Browning et al. | |
| 6,231,307 B1 | 5/2001 | Correia | |
| 6,234,755 B1 | 5/2001 | Bunker et al. | |
| 6,321,449 B2 | 11/2001 | Zhao et al. | |
| 6,368,060 B1 | 4/2002 | Fehrenbach et al. | |
| 6,383,602 B1 | 5/2002 | Fric et al. | |
| 6,405,435 B1 | 6/2002 | Konter et al. | |
| 6,412,541 B2 | 7/2002 | Roesler et al. | |
| 6,427,327 B1 | 8/2002 | Bunker | |
| 6,551,061 B2 | 4/2003 | Darolia et al. | |
| 6,582,194 B1 | 6/2003 | Birkner et al. | |
| 6,602,053 B2 | 8/2003 | Subramanian et al. | |
| 6,617,003 B1 | 9/2003 | Lee et al. | |
| 6,905,302 B2 | 6/2005 | Lee et al. | |
| 6,921,014 B2 | 7/2005 | Hasz et al. | |
| 7,014,923 B2 | 3/2006 | Schnell et al. | |
| 7,094,475 B2 | 8/2006 | Schnell et al. | |
| 7,186,167 B2 | 3/2007 | Joslin | |
| 7,216,428 B2 | 5/2007 | Memmen et al. | |
| 7,302,990 B2 | 12/2007 | Bunker et al. | |
| 7,744,348 B2 | 6/2010 | Bezencon et al. | |
| 7,766,617 B1 | 8/2010 | Liang | |
| 7,775,768 B2 | 8/2010 | Devore et al. | |
| 8,147,196 B2 | 4/2012 | Campbell et al. | |
| 2002/0141868 A1 | 10/2002 | Lee et al. | |
| 2002/0141869 A1 | 10/2002 | Lee et al. | |
| 2002/0182074 A1 | 12/2002 | Bunker | |
| 2002/0197160 A1 | 12/2002 | Liang | |
| 2003/0118444 A1 | 6/2003 | Lee et al. | |
| 2004/0096328 A1 | 5/2004 | Soechting et al. | |
| 2006/0153680 A1 | 7/2006 | Liang | |
| 2010/0080688 A1 | 4/2010 | Bezencon et al. | |
| 2012/0111545 A1* | 5/2012 | Bunker et al. | 165/133 |
| 2013/0078418 A1* | 3/2013 | Bunker et al. | 428/131 |

OTHER PUBLICATIONS

Wei et al., "Curved Electrode and Electrochemical Machining Method and Assembly Employing the Same," U.S. Appl. No. 12/562,528, filed Sep. 18, 2009.

Zhang et al., Process and System for Forming Shaped Air Holes, U.S. Appl. No. 12/697,005, filed Jan. 29, 2010.

Lacy et al., "Hot Gas Path Component Cooling System," U.S. Appl. No. 12/765,372, filed Apr. 22, 2010.

Lacy et a., "Articles Which Include Chevron Film Cooling Holes, and Related Processes," U.S. Appl. No. 12/790,675, filed May 28, 2010.

Lambie et al., "An Overview on Micro-Meso Manufacturing Techniques for Micro-Heat Exchangers for Turbine Blade Cooling," International Journal Manufacturing Research, vol. 3, No. 1, 2008, pp. 3-26.

Bunker et al., "Components With Re-Entrant Shaped Cooling Channels and Methods of Manufacture," U.S. Appl. No. 12/943,624, filed Nov. 10, 2010.

Bunker et al., "Component and Methods of Fabricating and Coating a Component," U.S. Appl. No. 12/943,646, filed Nov. 10, 2010.

Bunker et al., "Method of Fabricating a Component Using a Fugitive Coating," U.S. Appl. No. 12/943,563, filed Nov. 10, 2010.

Bunker et al., "Components With Cooling Channels and Methods of Manufacture," U.S. Appl. No. 12/965,083, filed Dec. 10, 2010.

Bunker et al., "Method of Fabricating a Component Using a Two-Layer Structural Coating," U.S. Appl. No. 12/996,101, filed Dec. 13, 2010.

Bunker et al., "Turbine Components With Cooling Features and Methods of Manufacturing the Same," U.S. Appl. No. 12/953,177, filed Nov. 23, 2010.

Bunker, "Components With Cooling Channels and Methods of Manufacture," U.S. Appl. No. 13/026,595, filed Feb. 14, 2011.

Rebak et al., "Methods of Fabricating a Coated Component Using Multiple Types of Fillers," U.S. Appl. No. 13/083,701, filed Apr. 11, 2011.

Bunker et al., "Components With Cooling Channels Formed in Coating and Methods of Manufacture", U.S. Appl. No. 13/052,415, filed Mar. 21, 2011.

Rebak et al., "Component and Methods of Fabricating a Coated Component Using Multiple Types of Fillers," U.S. Appl. No. 13/095,129, filed Apr. 27, 2011.

Bunker, "Components With Cooling Channels and Methods of Manufacture", U.S. Appl. No. 13/168,144, filed Jun. 24, 2011.

Bunker et al., "Components With Cooling Channels and Methods of Manufacture", U.S. Appl. No. 13/210,697, filed Aug. 16, 2011.

Bunker, "Repair Methods for Cooled Components", U.S. Appl. No. 13/267,617, filed Oct. 6, 2011.

Bunker et al., Components With Laser Cladding and Methods of Manufacture, U.S. Appl. No. 13/278,816, filed Oct. 21, 2011.

Bunker, "Components With Microchannel Cooling", U.S. Appl. No. 13/326,540, filed Dec. 15, 2011.

Bunker, "Components With Microchannel Cooling", U.S. Appl. No. 13/448,469, filed Apr. 17, 2012.

Bunker, "Components With Microchannel Cooled Platforms and Fillets and Methods of Manufacture", U.S. Appl. No. 13/478,517, filed May 23, 2012.

Bunker et al., "Components With Cooling Channels and Methods of Manufacture", U.S. Appl. No. 13/595,120, filed Aug. 27, 2012.

Bancheri et al., "Method for Removal of Cores From Niobium-Based Part", U.S. Appl. No. 11/276,002, filed Feb. 9, 2006.

Bonini et al., "Methods of Forming Cooling Channels Using Backstrike Protection", U.S. Appl. No. 13/628,204, filed Sep. 27, 2012.

\* cited by examiner

COMPONENTS WITH RE-ENTRANT SHAPED COOLING CHANNELS AND METHODS OF MANUFACTURE

CROSS REFERENCE TO RELATED APPLICATIONS

This application is a continuation in part of U.S. patent application Ser. No. 12/943,624, Ronald Scott Bunker et al., entitled "Components with re-entrant shaped cooling channels and methods of manufacture," which patent application is incorporated by reference herein in its entirety.

BACKGROUND

The invention relates generally to gas turbine engines, and, more specifically, to micro-channel cooling therein.

In a gas turbine engine, air is pressurized in a compressor and mixed with fuel in a combustor for generating hot combustion gases. Energy is extracted from the gases in a high pressure turbine (HPT), which powers the compressor, and in a low pressure turbine (LPT), which powers a fan in a turbofan aircraft engine application, or powers an external shaft for marine and industrial applications.

Engine efficiency increases with temperature of combustion gases. However, the combustion gases heat the various components along their flowpath, which in turn requires cooling thereof to achieve an acceptably long engine lifetime. Typically, the hot gas path components are cooled by bleeding air from the compressor. This cooling process reduces engine efficiency, as the bled air is not used in the combustion process.

Gas turbine engine cooling art is mature and includes numerous patents for various aspects of cooling circuits and features in the various hot gas path components. For example, the combustor includes radially outer and inner liners, which require cooling during operation. Turbine nozzles include hollow vanes supported between outer and inner bands, which also require cooling. Turbine rotor blades are hollow and typically include cooling circuits therein, with the blades being surrounded by turbine shrouds, which also require cooling. The hot combustion gases are discharged through an exhaust which may also be lined and suitably cooled.

In all of these exemplary gas turbine engine components, thin walls of high strength superalloy metals are typically used to reduce component weight and minimize the need for cooling thereof. Various cooling circuits and features are tailored for these individual components in their corresponding environments in the engine. For example, a series of internal cooling passages, or serpentines, may be formed in a hot gas path component. A cooling fluid may be provided to the serpentines from a plenum, and the cooling fluid may flow through the passages, cooling the hot gas path component substrate and any associated coatings. However, this cooling strategy typically results in comparatively low heat transfer rates and non-uniform component temperature profiles.

Micro-channel cooling has the potential to significantly reduce cooling requirements by placing the cooling as close as possible to the heated region, thus reducing the temperature difference between the hot side and cold side of the main load bearing substrate material for a given heat transfer rate. However, current techniques for forming micro-channels typically require the use of a sacrificial filler to keep the coating from being deposited within the micro-channels, to support the coating during deposition, as well as the removal of the sacrificial filler after deposition of the coating system. However, both the filling of the channels with a fugitive material, and the later removal of that material present potential problems for current micro-channel processing techniques. For example, the filler must be compatible with the substrate and coatings, yet have minimal shrinkage, but also have sufficient strength. Removal of the sacrificial filler involves potentially damaging processes of leaching, etching, or vaporization, and typically requires long times. Residual filler material is also a concern.

It would therefore be desirable to provide a method for forming cooling channels in hot gas path components that further eliminates the need for the filling and removal processes.

BRIEF DESCRIPTION OF THE INVENTION

One aspect of the present invention resides in a method of fabricating a component. The component includes a substrate that has at least one interior space. The method includes forming one or more grooves in the component, where each groove extends at least partially along an outer surface of the substrate and narrows at an opening thereof, such that each groove comprises a re-entrant shaped groove. The cross-sectional area A of each groove is in a range of about 2 to about 3 times an area $R=W*D$, where W is the width of the opening of the re-entrant-shaped groove and D is the depth of the re-entrant-shaped groove.

Another aspect of the present invention resides in a component that includes a substrate having an outer surface and an inner surface, where the inner surface defines at least one interior space, and the outer surface defines one or more grooves. Each groove extends at least partially along the surface of the substrate and narrows at an opening thereof, such that each groove comprises a re-entrant shaped groove. The cross-sectional area A of each groove is in a range of about 2 to about 3 times an area $R=W*D$, where W is the width of the opening of the re-entrant-shaped groove, and D is the depth of the re-entrant-shaped groove. The component further includes at least one coating disposed over at least a portion of the outer surface of the substrate, where the groove(s) and the coating together define one or more re-entrant shaped channels for cooling the component.

Yet another aspect of the present invention resides in a component that includes a substrate having an outer surface and an inner surface, where the inner surface defines at least one interior space. The component further includes at least one coating disposed over at least a portion of the surface of the substrate, where the coating includes at least an inner layer of a structural coating disposed on the outer surface of the substrate and an additional coating. One or more grooves are formed at least partially in the structural coating, where each groove extends at least partially along the surface of the substrate and narrows at an opening thereof, such that each groove comprises a re-entrant shaped groove. The cross-sectional area A of each groove is in a range of about 2 to about 3 times an area $R=W*D$, where W is the width of the opening of the re-entrant-shaped groove and D is the depth of the re-entrant-shaped groove. The groove(s) and the additional coating together define one or more re-entrant shaped channels for cooling the component.

DRAWINGS

These and other features, aspects, and advantages of the present invention will become better understood when the following detailed description is read with reference to the accompanying drawings in which like characters represent like parts throughout the drawings, wherein.

Figure 7:
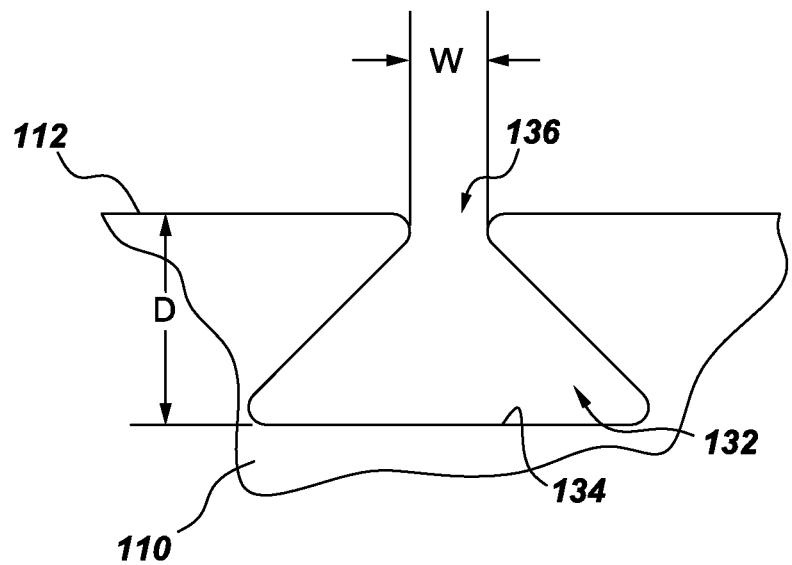
Figure 8:
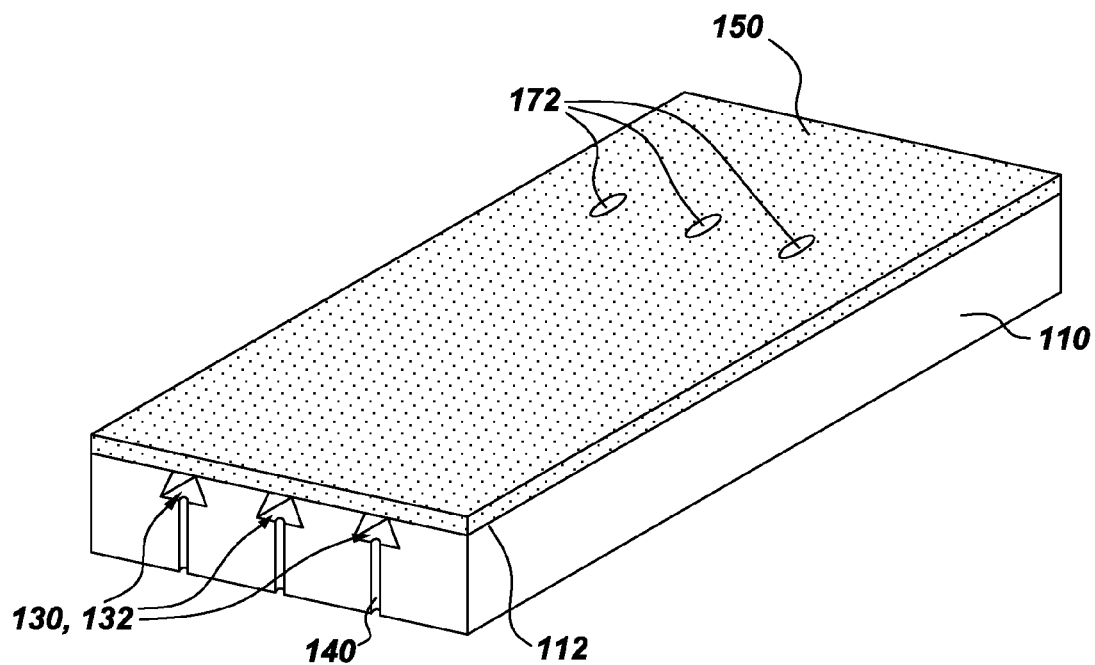
Figure 9:
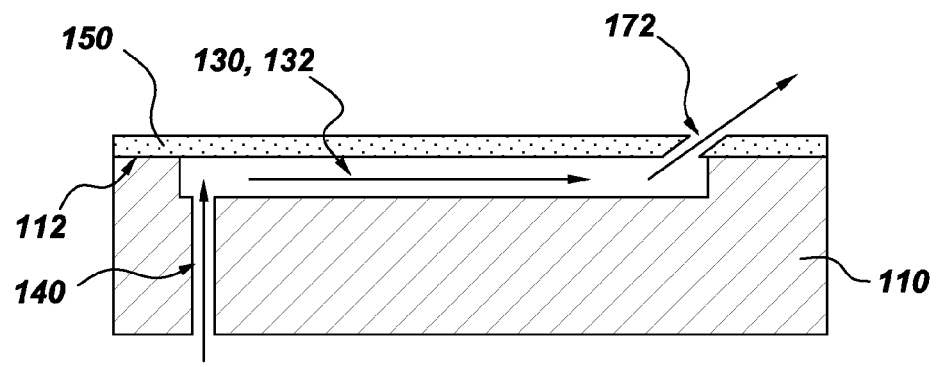
Figure 10:
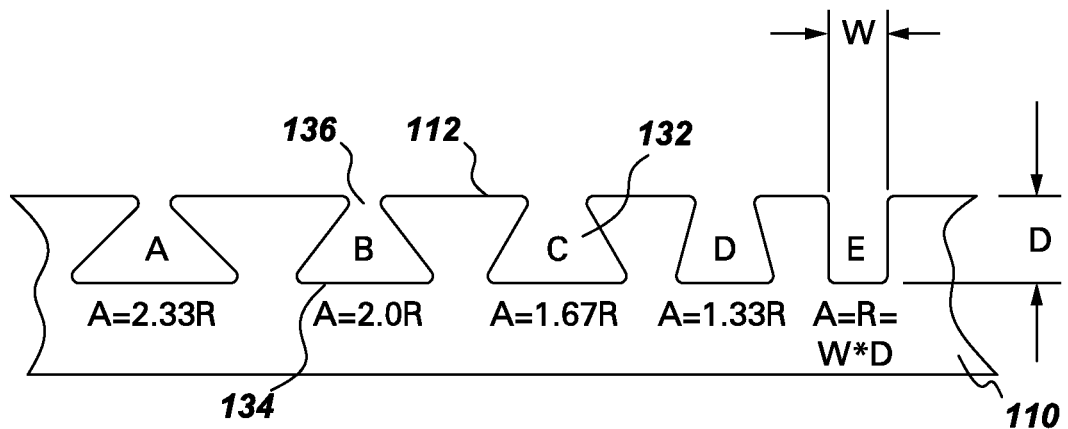
Figure 11:
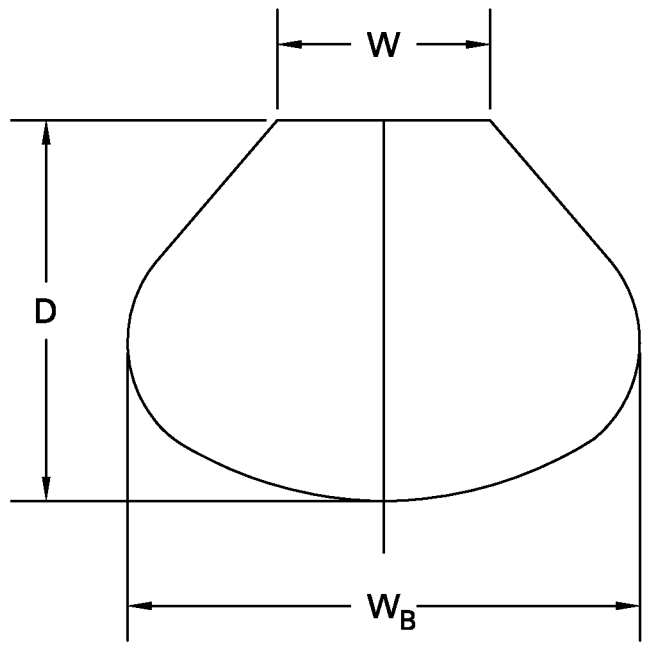
Figure 12:
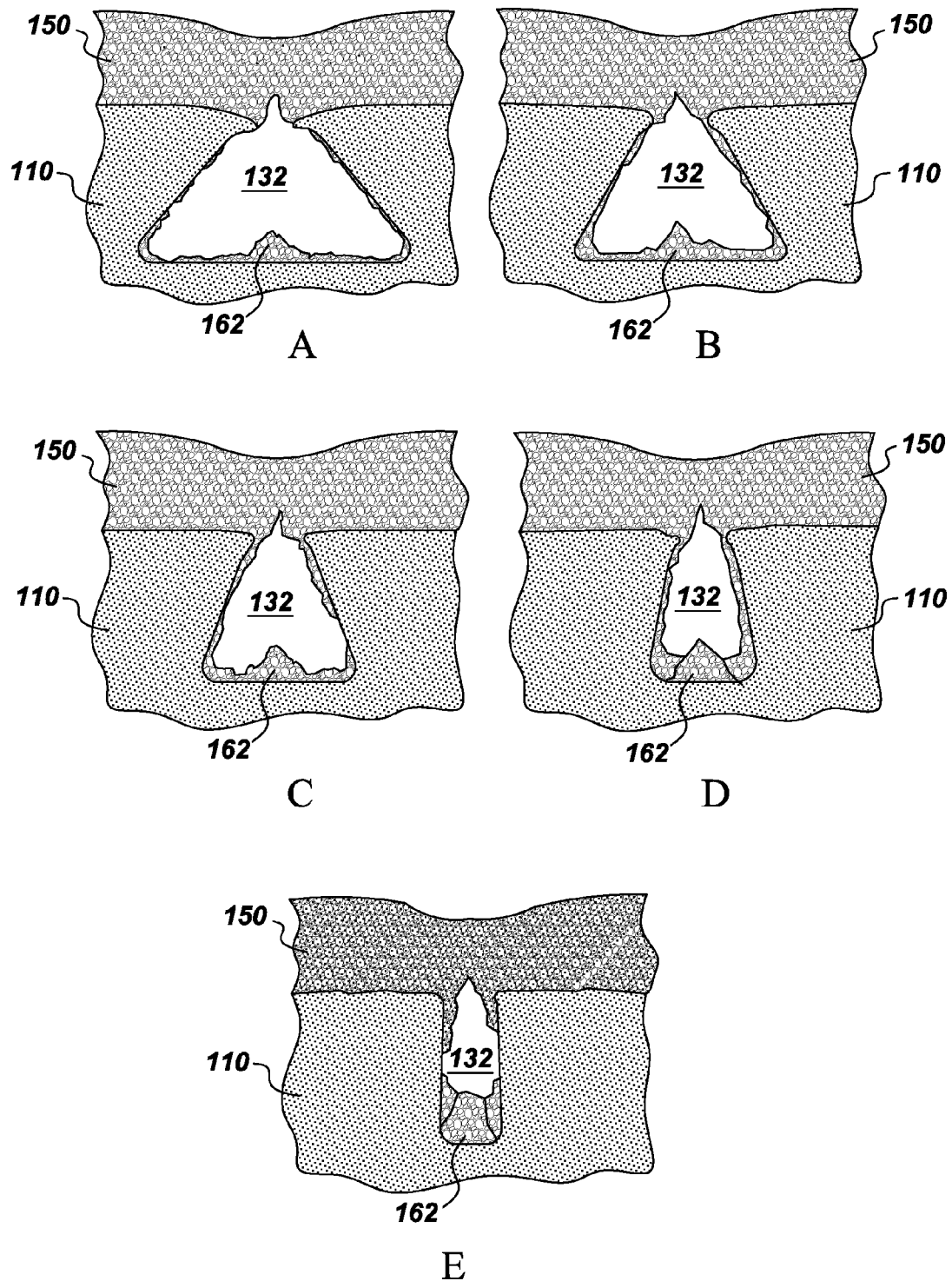
Figure 13:
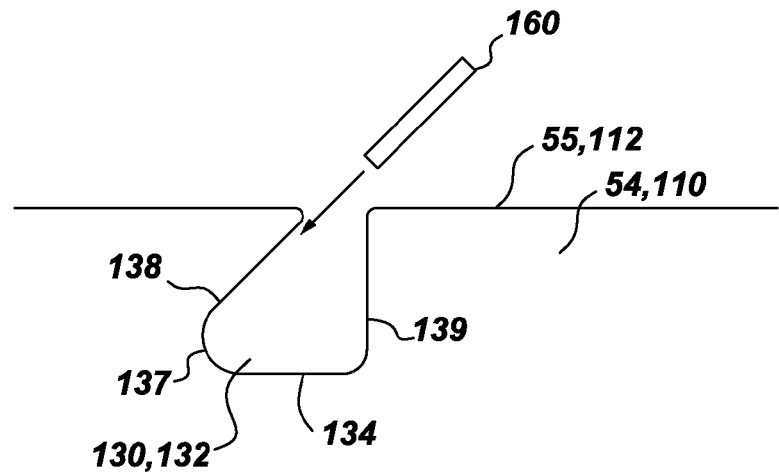
Figure 14:
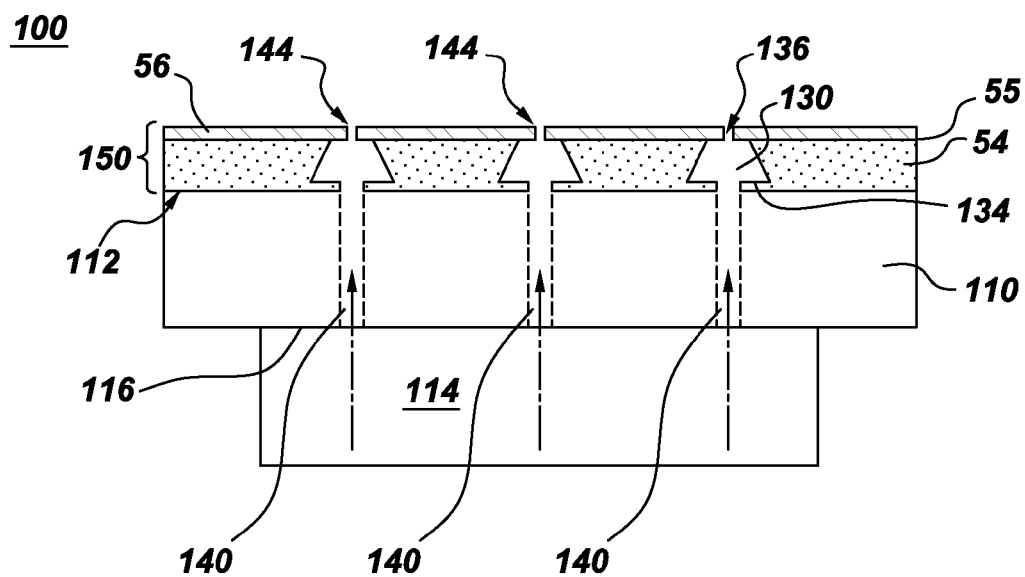
Figure 15:
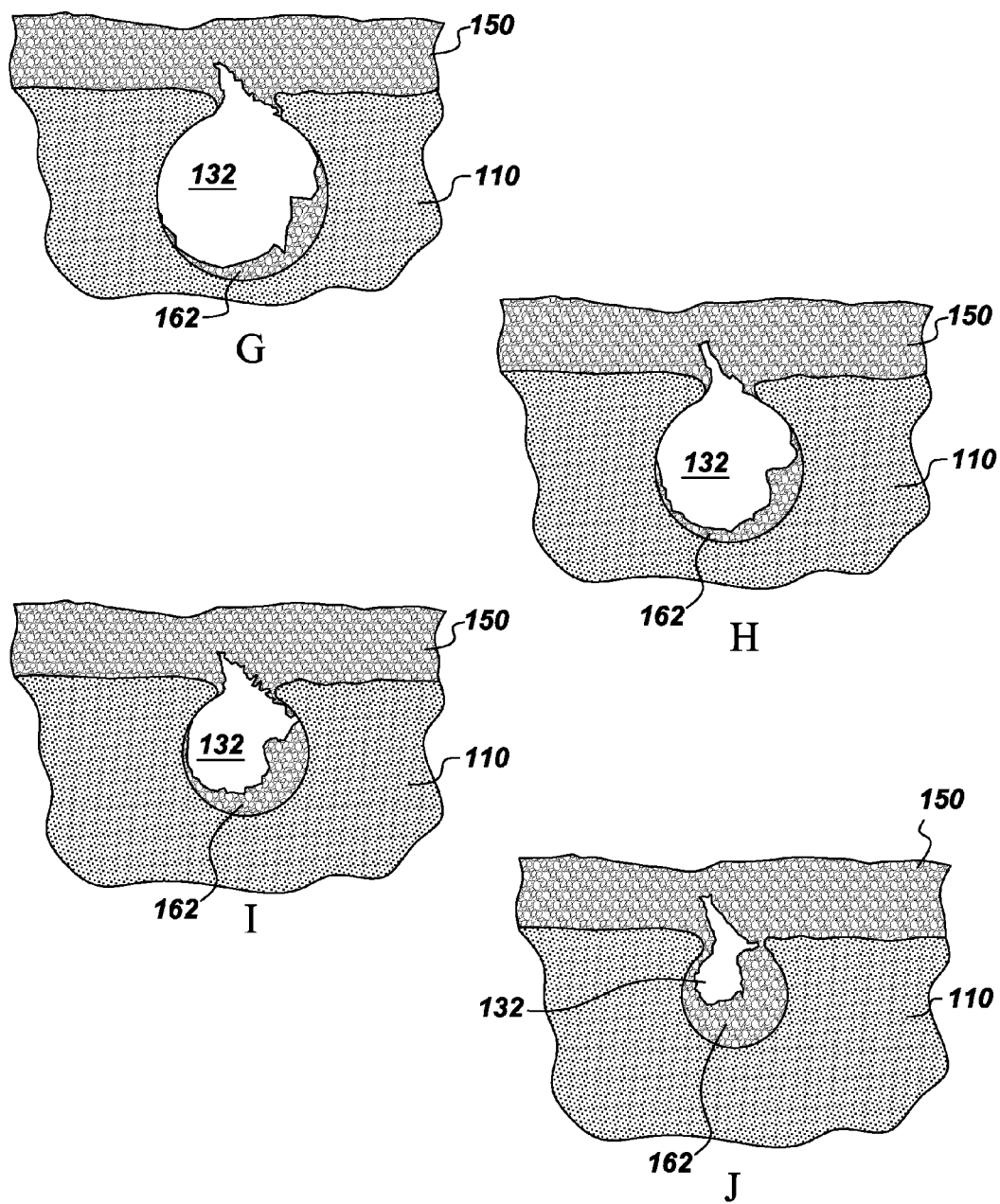

FIG. 7 schematically depicts, in cross-section, an exemplary re-entrant shaped groove;

FIG. 8 schematically depicts, in perspective view, three example micro-channels that extend partially along the surface of the substrate and channel coolant to respective film cooling holes;

FIG. 9 is a cross-sectional view of one of the example microchannels of FIG. 8 and shows the micro-channel conveying coolant from an access hole to a film cooling hole;

FIG. 10 schematically depicts, in cross-sectional view, five cooling channels A-E with varying cross-sectional areas from A=R to A=2.33 R;

FIG. 11 schematically depicts, in cross-sectional view, an exemplary tear drop shaped cooling channel, in accordance with aspects of the present invention;

FIG. 12 illustrates the amount of coating (relative to the overall cross-sectional area of the respective cooling channels) deposited within the five cooling channels A-E of FIG. 10;

FIG. 13 schematically depicts, in cross-sectional view, an exemplary cooling channel having an asymmetric cross-section;

FIG. 14 shows cooling channels with permeable slots formed in a structural coating; and FIG. 15 illustrates the amount of coating (relative to the overall cross-sectional area of the respective cooling channels) deposited within four rounded cooling channels G-J.

DETAILED DESCRIPTION OF THE INVENTION

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The modifier "about" used in connection with a quantity is inclusive of the stated value, and has the meaning dictated by context, (e.g., includes the degree of error associated with measurement of the particular quantity). In addition, the term "combination" is inclusive of blends, mixtures, alloys, reaction products, and the like.

Moreover, in this specification, the suffix "(s)" is usually intended to include both the singular and the plural of the term that it modifies, thereby including one or more of that term (e.g., "the passage hole" may include one or more passage holes, unless otherwise specified). Reference throughout the specification to "one embodiment," "another embodiment," "an embodiment," and so forth, means that a particular element (e.g., feature, structure, and/or characteristic) described in connection with the embodiment is included in at least one embodiment described herein, and may or may not be present in other embodiments. Similarly, reference to "a particular configuration" means that a particular element (e.g., feature, structure, and/or characteristic) described in connection with the configuration is included in at least one configuration described herein, and may or may not be present in other configurations. In addition, it is to be understood that the described inventive features may be combined in any suitable manner in the various embodiments and configurations.

Figure 1:
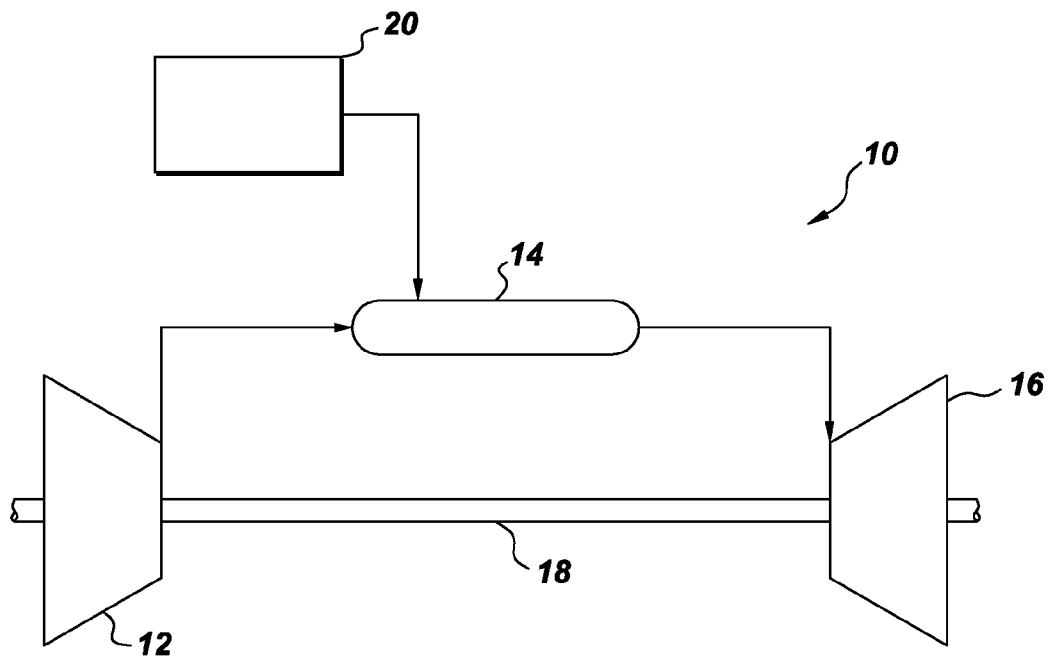
FIG. 1 is a schematic illustration of a gas turbine system.

FIG. 1 is a schematic diagram of a gas turbine system 10. The system 10 may include one or more compressors 12, combustors 14, turbines 16, and fuel nozzles 20. The compressor 12 and turbine 16 may be coupled by one or more shafts 18.

The gas turbine system 10 may include a number of hot gas path components 100. A hot gas path component is any component of the system 10 that is at least partially exposed to a flow of high temperature gas through the system 10. For example, bucket assemblies (also known as blades or blade assemblies), nozzle assemblies (also known as vanes or vane assemblies), shroud assemblies, transition pieces, retaining rings, and turbine exhaust components are all hot gas path components. However, it should be understood that the hot gas path component 100 of the present invention is not limited to the above examples, but may be any component that is at least partially exposed to a flow of high temperature gas. Further, it should be understood that the hot gas path component 100 of the present disclosure is not limited to components in gas turbine systems 10, but may be any piece of machinery or component thereof that may be exposed to high temperature flows.

When a hot gas path component 100 is exposed to a hot gas flow, the hot gas path component 100 is heated by the hot gas flow and may reach a temperature at which the hot gas path component 100 is substantially degraded or fails. Thus, in order to allow system 10 to operate with hot gas flow at a high temperature, as required to achieve the desired efficiency, performance and/or life of the system 10, a cooling system for the hot gas path component 100 is needed.

In general, the cooling system of the present disclosure includes a series of small channels, or micro-channels, formed in the surface of the hot gas path component 100. For industrial sized power generating turbine components, "small" or "micro" channel dimensions would encompass approximate depths and widths in the range of 0.25 mm to 1.5 mm, while for aviation sized turbine components channel dimensions would encompass approximate depths and widths in the range of 0.1 mm to 0.5 mm. The hot gas path component may be provided with a protective coating. A cooling fluid may be provided to the channels from a plenum, and the cooling fluid may flow through the channels, cooling the hot gas path component.

A fabrication method is described with reference to FIGS. 2-15. As indicated for example in FIG. 2, the method is for fabricating a component 100 that includes a substrate 110 having at least one interior space 114. The substrate 110 is typically cast prior to forming the groove(s) 132. As discussed in U.S. Pat. No. 5,626,462, Melvin R. Jackson et al.,"Double-wall airfoil," which is incorporated herein in its entirety, substrate 110 may be formed from any suitable material. Depending on the intended application for component 100, this could include Ni-base, Co-base and Fe-base superalloys. The Ni-base superalloys may be those containing both γ and γ' phases, particularly those Ni-base superalloys containing both γ and γ' phases wherein the γ' phase occupies at least 40% by volume of the superalloy. Such alloys are known to be advantageous because of a combination of desirable properties including high temperature strength and high temperature creep resistance. The substrate material may also comprise a NiAl intermetallic alloy, as these alloys are also known to possess a combination of superior properties including high-temperature strength and high temperature creep resistance that are advantageous for use in turbine engine applications used for aircraft. In the case of Nb-base alloys, coated Nb-base alloys having superior oxidation resistance will be preferred, particularly those alloys comprising Nb-(27-40)Ti-(4.5-10.5)Al-(4.5-7.9)Cr-(1.5-5.5)Hf-(0-6)V, where the composition ranges are in atom per cent. The substrate material may also comprise a Nb-base alloy that contains at least one secondary phase, such as a Nb-containing intermetallic compound comprising a silicide, carbide or boride. Such alloys are composites of a ductile phase (i.e., the Nb-base alloy) and a strengthening phase (i.e., a Nb-containing intermetallic compound). For other arrangements, the substrate material comprises a molybdenum based alloy, such as alloys based on molybdenum (solid solution) with $Mo_5SiB_2$ and/or $Mo_3Si$ second phases. For other configurations, the substrate material comprises a ceramic matrix composite (CMC), such as a silicon carbide (SiC) matrix reinforced with SiC fibers. For other configurations the substrate material comprises a TiAl-based intermetallic compound.

Referring now to FIGS. 3, 4 and 6-8, the fabrication method includes forming one or more grooves 132 in the component 100. As indicated, for example, in FIG. 8, each groove 132 extends at least partially along an outer surface 112 of the substrate 110 and narrows at an opening 136 thereof, such that each groove 132 comprises a re-entrant shaped groove 132. For the configuration shown in FIG. 3, the grooves channel coolant to respective film cooling holes 172. Example techniques for forming groove(s) 132 include, without limitation, abrasive liquid jet, plunge electrochemical machining (ECM), electric discharge machining (EDM) with a spinning electrode (milling EDM) and laser machining. Example laser machining techniques are described in commonly assigned, U.S. patent application Ser. No. 12/697,005, "Process and system for forming shaped air holes" filed Jan. 29, 2010, which is incorporated by reference herein in its entirety. Example EDM techniques are described in commonly assigned U.S. patent application Ser. No. 12/790,675, "Articles which include chevron film cooling holes, and related processes," filed May 28, 2010, which is incorporated by reference herein in its entirety. For particular processes, the groove(s) 132 are formed using abrasive liquid jet is discussed in greater detail below, with reference to FIGS. 3-5.

Referring now to FIGS. 7 and 10, for example, the cross-sectional area A of each groove is in the range of about 2 to about 3 times the area R=W*D, where W is the width of the opening 136 of the re-entrant-shaped groove 132 and D is the depth of the re-entrant-shaped groove 132. In other words, the area R is the cross-sectional area of a hypothetical rectangular groove having the same width at the opening and the same depth as the re-entrant shaped groove. For example, channels A and B in FIG. 10 have areas A of 2.33 R and 2 R, respectively. Beneficially, cooling channels with cross-sectional areas A in the range of about 2 to about 3 times the area R=W*D may have negligible coating deposited in the channel during the coating process without the use of a sacrificial filler.

For particular configurations, each groove 132 is symmetric about the centerline. As used here, "symmetric" should be understood to encompass minor deviations in the profile of the groove resulting from machining accuracy. For example, the grooves shown in FIGS. 6-8 and 10-12 are symmetric about the centerline. The grooves may have flat bases 134, as shown in FIGS. 6-8 and 10, for example. For other configurations, the base 134 of the groove 132 may be rounded. For example, the groove may be tear-drop shaped, as shown for example in FIG. 11. Beneficially, channels that are essentially symmetric about the centerline have relatively higher cross-sectional areas relative to asymmetric channels, such as those shown in FIG. 13 (for the same depth and opening width).

However, for other configurations, each groove 132 may have an asymmetric cross-section, as shown, for example, in FIG. 13. Asymmetric grooves are discussed in commonly assigned, U.S. patent application Ser. No. 13/664,458, which is incorporated herein in its entirety. Asymmetric cross-sections may be necessary in certain difficult-to machine regions of the component or to accommodate other features and/or design constraints within the component.

As noted above, a number of techniques may be used to form the grooves 132. For the exemplary process shown in FIGS. 3 and 4, each groove 132 is formed by directing an abrasive liquid jet 160 at the outer surface 112 of the substrate 110. For the process shown in FIGS. 3 and 4, at least one groove 132 is formed by directing the abrasive liquid jet 160 at a lateral angle relative to the surface 112 of the substrate 110, in one or more passes of the abrasive liquid jet 160.

Example abrasive liquid jet drilling processes and systems are provided in commonly assigned U.S. patent application Ser. No. 12/790,675, "Articles which include chevron film cooling holes, and related processes", filed May 28, 2010, which is incorporated by reference herein in its entirety. As explained in U.S. patent application Ser. No. 12/790,675, the abrasive liquid jet process typically utilizes a high-velocity stream of abrasive particles (e.g., abrasive "grit"), suspended in a stream of high pressure water. The pressure of the liquid may vary considerably, but is often in the range of about 35-620 MPa. A number of abrasive materials can be used, such as garnet, aluminum oxide, silicon carbide, and glass beads. Beneficially, the capability of abrasive liquid jet machining techniques facilitates the removal of material in stages to varying depths and with control over the shape of the machined features.

Figure 4:
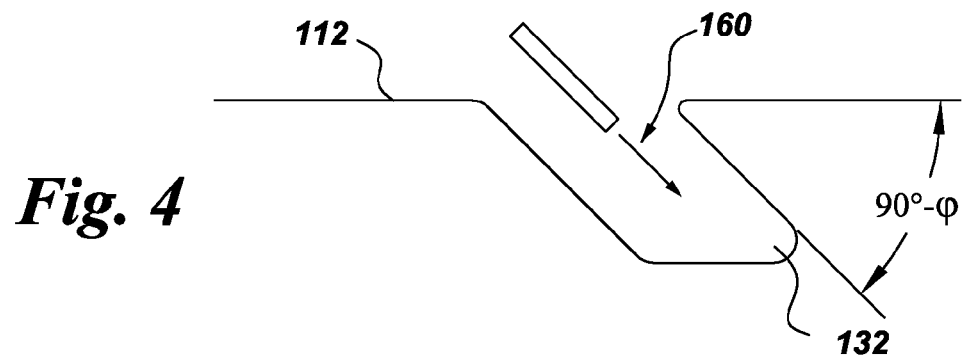
FIG. 4 illustrates a second pass of the abrasive liquid jet at an opposite angle 180-φ for forming the re-entrant groove.
Figure 5:
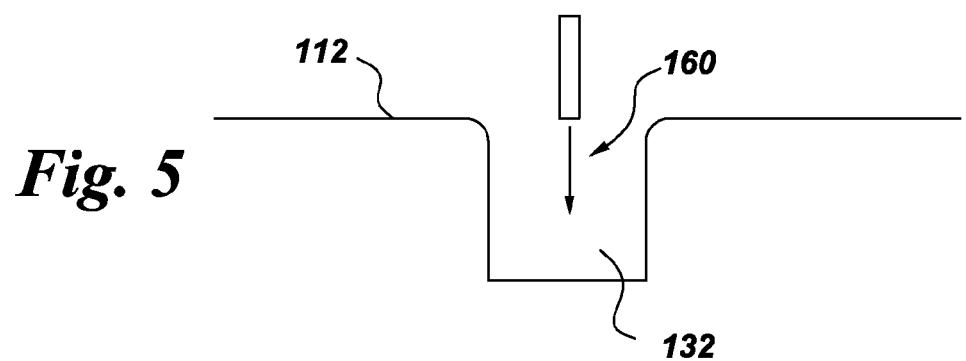
FIG. 5 illustrates an optional third pass of the abrasive liquid jet normal to the groove, for forming the re-entrant groove.

In addition, and as explained in U.S. patent application Ser. No. 12/790,675, the water jet system can include a multi-axis computer numerically controlled (CNC) unit 210 (FIG. 4). The CNC systems themselves are known in the art, and described, for example, in US Patent Publication 1005/0013926 (S. Rutkowski et al), which is incorporated herein by reference in its entirety. CNC systems allow movement of the cutting tool along a number of X, Y, and Z axes, as well as the tilt axes.

In addition, the step of forming the groove 132 may further include performing at least one additional pass, where the abrasive liquid jet 160 is directed toward a base 134 of the groove 132 at one or more angles between the lateral angle and a direction 52 substantially normal to the outer surface 112 of the substrate 110, such that material is removed from the base 134 of the groove 132. (See FIG. 5.) It should be noted that as used here "base" is the lower portion of the groove and may be curved (FIG. 11) or flat (FIG. 10).

Referring now to FIGS. 8 and 9, the fabrication method may further include forming one or more access holes 140 in the substrate 110. As show, for example, in FIG. 14, each access hole 140 connects the respective groove 132 in fluid communication with the respective interior space 114. It should be noted that the holes 140 shown in FIG. 8 are discrete holes located in the cross-section shown and do not extend through the substrate along the length of the grooves 132.

The interior access holes 140 supplying the respective grooves may be drilled either as a straight hole of constant cross section, a shaped hole (elliptical etc.), or a converging or diverging hole (not shown). Methods for forming the access holes are provided in commonly assigned U.S. patent application Ser. No. 13/210,697, Ronald S. Bunker et al., "Components with cooling channels and methods of manufacture," which is incorporated by reference herein in its entirety. For particular processes, the access hole(s) 140 may be formed using an abrasive liquid jet, which is described above. As noted, abrasive liquid jet machining beneficially facilitates the removal of material in stages to varying depths and with control over the shape of the machined features. This allows the interior access holes 140 that supply the channel to be drilled in the shapes noted above, that is, a straight hole of constant cross section, a shaped hole, or a converging or diverging hole.

For particular configurations, the grooves 132 are formed in the outer surface 112 of the substrate 110. See, for example, FIGS. 8 and 9. Referring now to FIGS. 8, 9 and 12, the fabrication method may further include disposing a coating 150 over at least a portion of the surface 112 of the substrate 110. For these arrangements, the groove(s) 132 and the coating 150 together define one or more re-entrant shaped channels 130 for cooling the component 100. The coating 150 comprises structural coating layers and may further include optional additional coating layer(s). The coating layer(s) may be deposited using a variety of techniques. For particular processes, the structural coating may be deposited by performing ion plasma deposition (also known in the art as cathodic arc deposition). Example ion plasma deposition apparatus and method are provided in commonly assigned, US Published Patent Application No. 20080138529, Weaver et al, "Method and apparatus for cathodic arc ion plasma deposition," which is incorporated by reference herein in its entirety. Briefly, ion plasma deposition comprises placing a consumable cathode having a composition to produce the desired coating material within a vacuum chamber, providing a substrate 110 within the vacuum environment, supplying a current to the cathode to form a cathodic arc upon a cathode surface resulting in arc-induced erosion of coating material from the cathode surface, and depositing the coating material from the cathode upon the substrate surface 112.

Non-limiting examples of a structural coating deposited using ion plasma deposition are described in U.S. Pat. No. 5,626,462, Jackson et al.,"Double-wall airfoil". For certain hot gas path components 100, the structural coating 54 comprises a nickel-based or cobalt-based alloy, and more particularly comprises a superalloy or a (Ni,Co)CrAlY alloy. Where the substrate material is a Ni-base superalloy containing both γ and γ' phases, structural coating may comprise similar compositions of materials, as discussed in U.S. Pat. No. 5,626,462. Additionally, for superalloys the structural coating 54 may comprise compositions based on the γ'-$Ni_3Al$ family of alloys.

More generally, the structural coating composition will be dictated by the composition of the underlying substrate. For example, for CMC substrates, such as a silicon carbide (SiC) matrix reinforced with SiC fibers, the structural coating will typically include silicon.

For other process configurations, the structural coating is deposited by performing at least one of a thermal spray process and a cold spray process. For example, the thermal spray process may comprise combustion spraying or plasma spraying, the combustion spraying may comprise high velocity oxygen fuel spraying (HVOF) or high velocity air fuel spraying (HVAF), and the plasma spraying may comprise atmospheric (such as air or inert gas) plasma spray, or low pressure plasma spray (LPPS, which is also known as vacuum plasma spray or VPS). In one non-limiting example, a (Ni,Co)CrAlY coating is deposited by HVOF or HVAF. Other example techniques for depositing the structural coating include, without limitation, sputtering, electron beam physical vapor deposition, entrapment plating, and electroplating.

As discussed in U.S. patent application Ser. No. 12/943,624, Bunker et al., "Components with re-entrant shaped cooling channels and methods of manufacture," current techniques for forming micro-channels typically require the use of a sacrificial filler to keep the coating from being deposited within the micro-channels, to support the coating during deposition, as well as the removal of the sacrificial filler after deposition of the coating system. However, both the filling of the channels with a fugitive material, and the later removal of that material present potential problems for current micro-channel processing techniques. For example, the filler must be compatible with the substrate and coatings, yet have minimal shrinkage, but also have sufficient strength. Removal of the sacrificial filler involves potentially damaging processes of leaching, etching, or vaporization, and typically requires long times. Residual filler material is also a concern.

The shaping of a channel with a re-entrant geometry and a small top surface opening width assists in keeping coating deposits out of the channel. However, when fillers are not employed, the opening width of the channel may not be sufficient to keep deposits of coating material out of the channel. FIG. 12 depicts example fill ratios for channels of differing cross-sectional areas A. As used here, the "fill ratio" is the percent of channel area occupied by coating that is deposited (indicated by reference numeral 162 in FIG. 12) within the channel. For example, if no coating were deposited within the channel, the fill ratio would be 0. Similarly, if the entire cross-sectional area of the channel is filled with deposited coating, the fill ratio would be 100%. It should be noted that for the example shown in FIG. 12, channels A-E have equal opening widths. However, as shown in FIG. 12, a significant portion of the rectangular channel is filled with coating, whereas the re-entrant channels have less and less coating deposit, as a fraction of the channel cross-sectional area, as the channels become more re-entrant in profile (that is, going from D to A). Although smaller opening widths approaching zero will aid in keeping coating deposits out of the channels, this does not explain the behavior seen here.

Without being bound by a particular theory, the directed and impacting spray is believed to trap and to some degree pressurize (perhaps by heating) air within the channel volume, and this trapped air serves as a back-pressure and blockage denying the coating particles (most or all) access to the interior of the channel. This physical explanation for the observed phenomena is particularly applicable to any process carried out in air, such as thermal spray coating. Although the impinging spray has a much larger effective diameter than the size of the channel opening, this is not sufficient alone to provide the observed effect. A sufficient interior volume of pressurized blocking air is required, which may also circulate within the volume, hence leading to a range of desirable and necessary ratios of channel cross sectional areas that will provide the observed results.

For particular processes, the fill ratio for the coating deposited in each groove is less than twenty percent and, more particularly, less than ten percent. See, for example, channels A and B in FIG. 12 and channel G in FIG. 15. Briefly, FIG. 15 shows the amount of coating (relative to the overall cross-sectional area of the respective cooling channels) deposited within four rounded cooling channels G-J. As can be seen in FIG. 15, A>2 R for cooling channel G, A~2 R for cooling channel H, and A<2 R for cooling channels I and J. Although the amount of coating deposited 162 within the channels G-J is about the same in each cooling channel, the percentage of the cross-sectional area occupied by the coating deposit 162 is much smaller for cooling channel G, than it is for cooling channel J. Beneficially, having a relatively open channel improves cooling flow through the channel.

Referring now to FIG. 14, the coating includes at least a structural coating 54 and an addition coating 56, and each groove 132 is at least partially formed in the structural coating 54. For particular configurations (FIG. 14), the grooves are formed completely within the structural coating 54. However, for other configurations (not shown), the grooves extend through the structural coating into the substrate 110.

Beneficially, the above-described method facilitates coating the cooled components without the use of sacrificial fillers. By bridging the openings 136 with the coating 150 without the use of a sacrificial filler, two of the main processing steps (filling and leaching) for conventional channel forming techniques can be eliminated.

Figure 2:
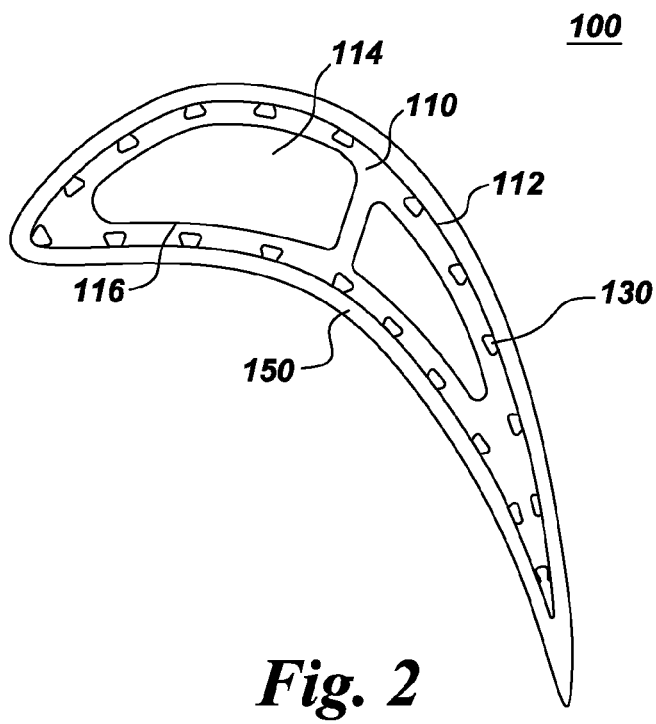
FIG. 2 is a schematic cross-section of an example airfoil configuration with re-entrant cooling channels, in accordance with aspects of the present invention.
Figure 3:
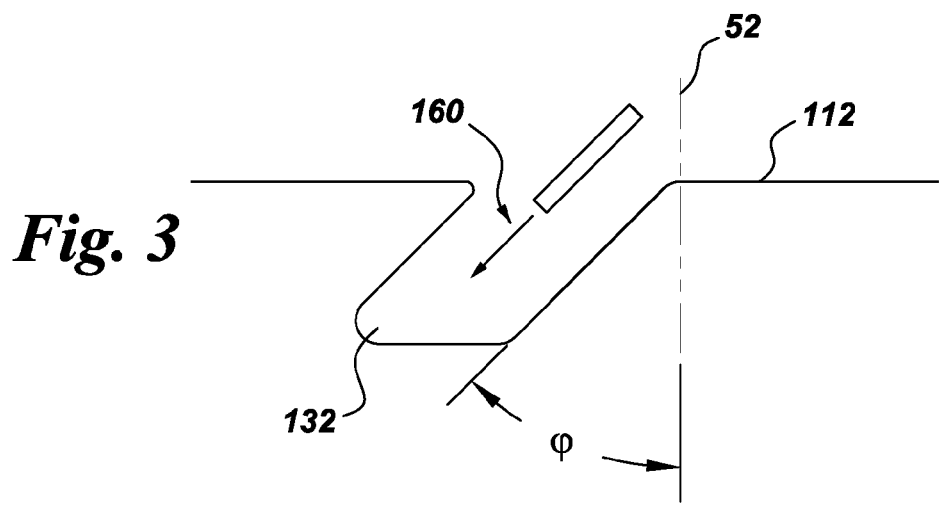
FIG. 3 illustrates a first pass of an abrasive liquid jet at an angle φ for forming a re-entrant groove.

A component 100 embodiment of the present invention is described with reference to FIGS. 2-15. As indicated in FIG. 2, the component 100 includes a substrate 110 having an outer surface 112 and an inner surface 116. The substrate 110 is described above. As shown in FIG. 2, for example, the inner surface 116 defines at least one interior space 114. As shown in FIG. 8, the outer surface 112 defines one or more grooves 132. Each groove 132 extends at least partially along the surface 112 of the substrate 110 and narrows at an opening 136 thereof, such that each groove 132 is a re-entrant shaped groove 132. Referring now to FIGS. 7 and 10, for example, the cross-sectional area A of each groove is in a range of about 2 to about 3 times an area R=W*D, where W is the width of the opening 136 of the re-entrant-shaped groove 132 and D is the depth of the re-entrant-shaped groove 132. As noted above, the area R is the cross-sectional area of a hypothetical rectangular groove having the same width at the opening and the same depth as the re-entrant shaped groove.

As indicated in FIG. 8, the component 100 further includes at least one coating 150 disposed over at least a portion of the outer surface 112 of the substrate 110. The coating 150 is described above and may comprise one or more coating layers having a single or distinct compositions. As indicated in FIG. 8, for example, the groove(s) 132 and the coating 150 together define one or more re-entrant shaped channels 130 for cooling the component 100. For particular configurations (FIGS. 8 and 12), the coating 150 completely bridges each groove 132, such that the coating 150 seals the respective micro-channel 130. However, for other configurations (see for example FIG. 14, which shows porous gaps 144 for the case of grooves formed within a structural coating layer 54), the coating 150 defines one or more porous gaps 144, such that the coating 150 does not completely bridge each groove 132.

Figure 6:
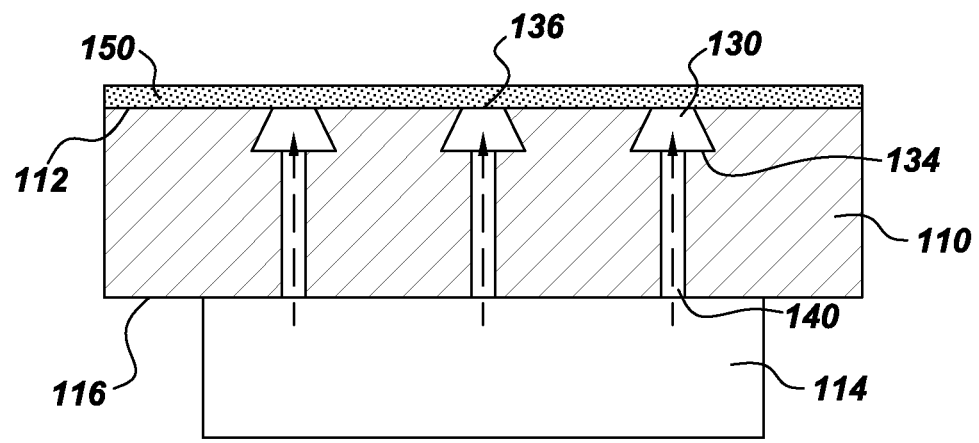
FIG. 6 is a schematic cross-section of a portion of a cooling circuit with re-entrant cooling channels.

For particular configurations, each groove 132 is symmetric about the centerline. As noted above, "symmetric" should be understood to encompass minor deviations in the profile of the groove resulting from machining accuracy. For example, the grooves shown in FIGS. 6-8 and 10-12 are symmetric about the centerline. The grooves may have a flat base, as shown in FIGS. 6-8, for example. For other configurations, the base 134 of the groove 132 may be rounded. For example, the groove may be tear-drop shaped, as shown for example in FIG. 11.

However, for other configurations, each groove 132 may have an asymmetric cross-section, as shown, for example, in FIG. 13. As noted above, asymmetric grooves are discussed in commonly assigned, U.S. patent application Ser. No. 13/664,458.

Referring now to FIGS. 8 and 9, one or more access holes 140 may be formed in the substrate 110. As indicated in FIG. 14, for example, each access hole connects the respective groove 132 in fluid communication with the respective interior space 114. As noted above, the holes 140 shown in FIG. 8 are discrete holes located in the cross-section shown and do not extend through the substrate along the length of the grooves 132. Access holes are described above with reference to FIGS. 8 and 9.

For particular configurations, the fill ratio for the coating deposited in each groove is less than twenty percent, and more particularly, is less than ten percent. See, for example, channels A and B in FIG. 12 and channel G in FIG. 15. As noted above, the "fill ratio" is the percent of channel area occupied by coating that is deposited within the channel. Beneficially, by having a relatively low fill ratio, the channels can convey sufficient coolant for a given channel cross-sectional area.

Benefits of the above described component include enhanced cooling with reduced manufacturing costs, by eliminating two of the more expensive process steps (filling and leaching) for coating conventional cooled components.

Another component 100 embodiment of the invention is described with reference to FIGS. 2-15. As indicated in FIG. 2, the component 100 includes a substrate 110 having an outer surface 112 and an inner surface 116. As indicated in FIG. 2, for example, the inner surface 116 defines at least one interior space 114. The substrate 110 is described above.

As indicated in FIG. 14, the component 100 further includes at least one coating 150 disposed over at least a portion of the surface 112 of the substrate 110. As indicated in FIG. 14, the coating 150 includes at least an inner layer of a structural coating 54 disposed on the outer surface 112 of the substrate 110 and an additional coating 56. This additional coating 56 may comprise one or more different coating layers. For example, the additional coating 56 may include an additional structural coating and/or optional additional coating layer(s), such as bond coatings, thermal barrier coatings (TBCs) and oxidation-resistant coatings. For particular configurations, the additional coating 56 comprises an outer structural coating layer (which is also indicated by reference numeral 56). For particular configurations, the structural coating 54 and additional coating 56 have a combined thickness in the range of 0.1-2.0 millimeters, and more particularly, in the range of 0.2 to 1 millimeter, and still more particularly 0.2 to 0.5 millimeters for industrial components. For aviation components, this range is typically 0.1 to 0.25 millimeters. However, other thicknesses may be utilized depending on the requirements for a particular component 100.

For the exemplary configuration shown in FIG. 14, the grooves 132 are formed at least partially in the structural coating 54. Each groove 132 extends at least partially along the surface 112 of the substrate 110 and narrows at an opening 136 thereof, such that each groove 132 comprises a re-entrant shaped groove (132). (This extension of the grooves alone the substrate is similar to the arrangement shown in FIG. 8 for the case of grooves formed in the substrate.) As discussed above with reference to FIG. 10, the cross-sectional area A of each groove is in a range of about 2 to about 5 times an area R=W*D, where W is the width of the opening 136 of the re-entrant-shaped groove (132) and D is the depth of the re-entrant-shaped groove 132. For example, channels A and B in FIG. 10 have areas A of 2.33 R and 2 R, respectively. As indicated in FIG. 14, for example, the grooves 132 and the additional coating 56 together define one or more re-entrant shaped channels 130 for cooling the component 100.

For particular configurations, each groove 132 is located entirely within the structural coating 54. See for example, FIG. 14. For other configurations (not expressly shown), each groove 132 extends through the structural coating 54 into the substrate 110. For particular configurations, the additional coating 56 completely bridges the respective grooves 132, such that the additional coating 56 seals the respective microchannels 130. (See, for example, FIG. 6 for the case of grooves formed within the substrate.) However, for other configurations, the additional coating 56 defines one or more porous gaps 144, such that the additional coating 150 does not completely bridge each of the respective grooves 132. (See, for example, FIG. 14.)

The geometry of the grooves is described above. For particular configurations, each groove 132 is symmetric about the centerline. For example, the grooves shown in FIGS. 6-8 and 10-12 are symmetric about the centerline. As noted above, the grooves may have a flat base 134, as shown in FIG. 14, for example. For other configurations, the base 134 of the groove 132 may be rounded. For example, the groove may be tear-drop shaped, as shown for example in FIG. 11.

However, for other configurations, each groove 132 may have an asymmetric cross-section, as shown, for example, in FIG. 13. As noted above, asymmetric grooves are discussed in commonly assigned, U.S. patent application Ser. No. 13/664,458.

As described above with reference to FIGS. 8 and 9, one or more access holes 140 may be formed in the substrate 110. As indicated in FIG. 14, for example, each access hole connects the respective groove 132 in fluid communication with the respective interior space 114. As noted above, the holes 140 shown in FIG. 8 are discrete holes located in the cross-section shown and do not extend through the substrate along the length of the grooves 132.

For particular configurations, the fill ratio for the coating deposited in each groove is less than twenty percent, and more particularly, is less than ten percent. See, for example, channels A and B in FIG. 12 and channel G in FIG. 15. As noted above, the "fill ratio" is the percent of channel area occupied by coating that is deposited within the channel.

Benefits of the above described method of manufacture and components include enhanced cooling and reduced manufacturing costs associated with the elimination of two of the more costly process steps (filling and leaching) for coating a cooled component.

The invention claimed is:

1. A method of fabricating a component comprising a substrate that has at least one interior space, the method comprising forming one or more grooves in the component,
    wherein each groove has a base and extends at least partially along an outer surface of the substrate and narrows at an opening thereof, such that each groove comprises a re-entrant shaped groove,
    wherein the base of a respective groove is rounded to define an overall teardrop shaped groove, and
    wherein a cross-sectional area A of each groove is in a range of about 2 to about 3 times an area R=W*D, where W is a width of the opening of the re-entrant-shaped groove, and D is a depth of the re-entrant-shaped groove.

2. The method of claim 1, wherein each groove is symmetric about the centerline.

3. The method of claim 1, wherein each groove has an asymmetric cross-section.

4. The method of claim 1, further comprising forming one or more access holes in the substrate, wherein each access hole connects one of the groove(s) in fluid communication with the respective interior space.

5. The method of claim 1, wherein the grooves are formed in the outer surface of the substrate.

6. The method of claim 1, further comprising disposing a coating over at least a portion of the surface of the substrate, wherein the groove(s) and the coating together define one or more re-entrant shaped channels for cooling the component.

7. The method of claim 6, wherein a fill ratio for the coating deposited in each groove is less than twenty percent.

8. The method of claim 7, wherein the fill ratio for the coating deposited in each groove is less than ten percent.

9. The method of claim 6, wherein the coating comprises at least a structural coating and an addition coating, and wherein each groove is at least partially formed in the structural coating.

10. A component comprising:
    a substrate having an outer surface and an inner surface, wherein the inner surface defines at least one interior space, wherein the outer surface defines one or more grooves, wherein each groove has a base and extends at least partially along the surface of the substrate and narrows at an opening thereof, such that each groove comprises a re-entrant shaped groove, wherein the base of a respective groove is rounded to define an overall teardrop shaped groove and wherein a cross-sectional area A of each groove is in a range of about 2 to about 3 times an area R=W*D, where W is a width of the opening of the re-entrant-shaped groove, and D is a depth of the re-entrant-shaped groove; and
    at least one coating disposed over at least a portion of the outer surface of the substrate, wherein the groove(s) and the coating together define one or more re-entrant shaped channels for cooling the component.

11. The component of claim 10, wherein each groove is symmetric about the centerline.

12. The component of claim 10, wherein each groove has an asymmetric cross-section.

13. The component of claim 10, wherein one or more access holes are formed in the substrate, and wherein each access hole connects the respective groove in fluid communication with the respective interior space.

14. The component of claim 10, wherein a fill ratio for the coating deposited in each groove is less than twenty percent.

15. The method of claim 14, wherein the coating is disposed by performing a thermal spray process.

16. The component of claim 14, wherein the fill ratio for the coating deposited in each groove is less than ten percent.

17. A component comprising:
    a substrate having an outer surface and an inner surface, wherein the inner surface defines at least one interior space; and
    at least one coating disposed over at least a portion of the surface of the substrate, wherein the coating comprises at least an inner layer of a structural coating disposed on the outer surface of the substrate and an additional coating,
    wherein one or more grooves are formed at least partially in the structural coating, wherein each groove has a base and extends at least partially along the surface of the substrate and narrows at an opening thereof, such that each groove comprises a re-entrant shaped groove,
    wherein the base of a respective groove is rounded to define an overall teardrop shaped groove,
    wherein a cross-sectional area A of each groove is in a range of about 2 to about 3 times an area R=W*D, where W is a width of the opening of the re-entrant-shaped groove and D is a depth of the re-entrant-shaped groove, and
    wherein the groove(s) and the additional coating together define one or more re-entrant shaped channels for cooling the component.

18. The component of claim 17, wherein each groove is symmetric about the centerline.

19. The component of claim 17, wherein each groove has an asymmetric cross-section.

20. The component of claim 17, wherein one or more access holes are formed in the substrate, and wherein each access hole connects the respective groove in fluid communication with the respective interior space.

21. The component of claim 17, wherein a fill ratio for the coating deposited in each groove is less than twenty percent.

22. The component of claim 21, wherein the fill ratio for the coating deposited in each groove is less than ten percent.

* * * * *